United States Patent Office 3,642,774
Patented Feb. 15, 1972

3,642,774
HIGHLY WATER SOLUBLE DEXTRIN PHOSPHATE
Ulrich Schobinger, Zug, Cla Christoffel, Waedenswil, and Kurt Berner, Pfaeffikon, Schwyz, Switzerland, assignors to Blattmann & Co., Waedenswil, Switzerland
No Drawing. Filed May 21, 1969, Ser. No. 826,707
Claims priority, application Switzerland, May 21, 1968, 7,533/68
Int. Cl. C08b 19/04
U.S. Cl. 260—233.5 R    12 Claims

ABSTRACT OF THE DISCLOSURE

Finely divided starch products classified as dextrin phosphate, having extremely light color, high cold water solubility and low and relatively stable viscosity in aqueous solution are provided by heating under low vacuum to 80–90° C., for 2 to 4 hours, a finely divided mixture of powdered starch and an aqueous solution of alkali metal phosphate and phosphoric acid having a pH between 2 and 5, such as a pH of about 3; then heating the mixture under high vacuum to and at a temperature between 125° and 140° C. for 1 to 3 hours to complete the dehydration and reaction of the material; and then cooling it with exclusion of oxygen, as under high vacuum. A water soluble aldehyde reacted in the mixture further enhances the stability of the product. The dextrin phosphate contains 0.3 to 3% of molecularly bound phosphorus. It is especially useful in mixtures with high molecular starch products and/or water soluble synthetic polymers for sizing textiles, and in mixtures with ketene dimers for surface sizing paper to inhibit ink penetration.

---

This invention relates to a process for the preparation of new phosphorus containing starch products, to the starch products obtained and to compositions making use of them. These products are thermally degraded phosphated starches characterized by high cold water solubility and a low viscosity in solution and may therefore be classified as phosphorylated dextrins, or simply as dextrin phosphates.

Processes for preparing phosphated starch products lead normally to products having a higher viscosity in solution than the starting starch material, showing viscosities of 5000 to 100,000 cps. in 5% solution in water at 25° C. Such products contain 1 to 5% of molecularly bound phosphorus and swell in cold water but show a very low cold water solubility, usually far below 10% at 25° C.

It has been proposed [see U.S. Pat. No. 3,320,237] to prepare cold water soluble starch phosphates containing 6 to 12% of molecularly bound phosphorus by a process starting with a slurry of starch in an aqueous solution of a large amount of alkali metal phosphate. The amount of phosphate required is far greater than the weight of the starch, being, for example, about 173 g. of

$NaH_2PO_4 \cdot 2H_2O$ per 100 g. of starch, corresponding to about 36 parts of phosphorus content per 100 parts of starch. Such a process is not commercially feasible, and it has further detriments in that, since the starch slurried into the strong phosphate solution is soaked therein and then filtered off for drying and heat treatment, an exact dosage of the reactant is impracticable and a large amount of its is lost. Moreover, starch phosphates prepared according to such a process give very brittle films, owing to their high content of incorporated phosphate.

It has now been found that starch can be converted into relatively low molecular products having very high cold water solubility and a low and relatively stable viscosity in water solution, together with an extremely light color, excellent film forming properties and compatibility with a wide variety of organic substances, by reacting starch in finely divided state with a limited quantity of an aqueous solution of alkali metal phosphate and phosphoric acid having a predetermined pH between 2 and 5, preferably a pH of about 3, while heating the mixture under low vacuum to a temperature of about 80 to 90° C.; then further heating the reaction mixture under increased vacuum to and at a temperature suitable for thermal degradation of the starch, such as one between 125° and 140° C.; and finally cooling the resulting dextrin phosphate while continuing to exclude oxygen from it until it is cool enough not to be oxidized by exposure to air.

The reaction of finely divided starch with a solution of alkali metal phosphate brought by phosphoric acid to the stated condition of acidity has been found to have a marked influence upon the extent of fixation of phosphorus in the end product obtained and also upon its water solubility and lightness of color. Phosphorylated starch products prepared according to the invention contain several-fold greater amounts of molecularly bound phosphorus and have much higher water solubilities and lighter color than do comparable products prepared similarly with phosphorus present in like amounts and at the same initial acidity but with the pH condition established by the use of other acids such as concentrated sulfuric acid, concentrated hydrochloric acid, or citric acid.

According to the invention, relatively low molecular dextrin phosphates are provided which contain between 0.3 and 3% by weight of molecularly bound phosphorus and have cold (25° C.) water solubilities that range from well above 30% up to complete (100%) solubility, with solubilities of 75 to 100% in water at 65° C. The products when in 5% solution in water at 25° C. have viscosities in the range of about 5 to 500 cps. They are white powders remarkably free of discoloration. Solutions of them show little tendency to set back, or retrograde, so that they have longer pot life than do solutions of conventional dextrins or soluble starches. Moreover, dry films formed from the solution are quite elastic and not sticky, yet are also highly reversible in that they may be dissolved easily in water.

Accordingly, the new dextrin phosphates are especially suitable for the surface sizing and coating of paper and for the sizing and finishing of textile fibers, yarns and fabrics, as well as for use in adhesive compositions. Since they show very good compatibility with many organic substances, including synthetic polymers such as polyacrylates, polyvinyl alcohols and polyvinyl acetates, they find fields of usefulness for which previously known starch products are not well suited.

The procedure most effective for the production of the new products is generally as follows:

A solution of alkali metal phosphate and phosphoric acid is prepared and added to finely divided starch, for example, by spraying it onto the granules, so as to add an amount of the phosphorus compounds corresponding to between 1 and 7 and preferably about 2 to 4 parts by weight of phosphorus contained in them per 100 parts of starch, of which phosphorus 25 to 70% is supplied in the phosphoric acid. The amount of added water is generally between 10 and 40 parts of water per 100 parts of starch.

The resulting moist acidic mixture of starch granules and phosphorus compounds is heated to 80 to 90° C. under a low vacuum, generally one of about 500 to 600 mm. Hg, for a period of 2 to 4 hours. This heating and the attendant dehydration of the mixture intimately concentrate and react the phosphorus compounds with the starch while moisture is still present in the granules. Then the reaction mixture is heated up to a higher temperature between 125° and 140° C. under a high vacuum of about 50 to 90 mm. Hg to complete the dehydration and is held in this temperature range under the vacuum for 1 to 3 hours for completion of the phosphorylation and degradation of the starch, whereupon the resulting dextrin phosphate is cooled under a continuing high vacuum such as one of about 50 to 70 mm. Hg.

The dextrin phosphate so produced is taken directly from the reaction vessel, or vacuum cooker, in a finely divided, white condition suitable for industrial uses. Because of the limited amount of added phosphate and of the extremely light color, no washing or purifying treatment or further processing of the product is required. Accordingly, it is comparatively economical to produce.

The phosphorus compounds suitable for the reaction include any of the alkali metal orthophosphates, hypophosphates, metaphosphates, pyrophosphates and polyphosphates, including polymetaphosphates, in admixture with any of the ortho-, hypo-, pyro- and meta-phosphoric acids.

The starch to be converted may be any of many types of naturally occurring starches, such, for example, as corn starch, potato starch, wheat starch, waxy maize, tapioca starch, milo starch, rice starch, or others.

According to another feature of the invention, it has been found that the new dextrin phosphates can be made with their stability further enhanced by carrying out the heating and reaction of the starch with the mixture of alkali metal phosphate and phosphoric acid in the presence of a small amount of a water soluble aldehyde. A normally solid aldehyde such as paraformaldehyde may be added in granular form to the starch, or an aldehyde such as formaldehyde, acetaldehyde, propionaldehyde or glyoxal may be added in liquid form to the reaction mixture. From 0.01 to 0.2% of the aldehyde is added, based on the weight of the starch.

In this way, a small amount of aldehyde is condensed in the phosphated starch products, and extremely stable cold water soluble dextrin phosphates are obtained. The gelatinization characteristics of these aldehyde-modified products are so suppressed that solutions of them have a suitable low and very stable viscosity even after being heated to an elevated temperature, such as 95° C., and cooled down to 25° C.

Among the valuable uses which have been found for the new dextrin phosphates are uses of them as a major constituent of new compositions for the sizing of textiles, as in the weaving of cellulosic fibers or yarns, such as cotton, or synthetic fibers, or yarns of mixed cellulosic and synthetic fibers.

For the sizing of cotton and other yarns of spun fibers, it is advantageous to mix a major proportion of the relatively low molecular dextrin phosphate with a minor proportion of a high molecular nitrogen containing starch, such as one having a viscosity of about 40,000 to 60,000 cps. when in 5% solution in water at 25° C., as prepared according to the process of U.S. Pat. No. 3,352,848. For example, mixtures of 60 to 80 parts of the former with 20 to 40 parts of the latter are quite effectual.

These compositions form sizing solutions of extreme stability, which do not thicken objectionably upon prolonged standing. In the use of the solutions, the low molecular dextrin phosphate penetrates deeply into the yarn while the high molecular starch phosphate settles as a cover skin on outer surfaces of the yarn. Thus, a uniform sizing is obtained which protects the yarn most effectively against the mechanical and abrasive action of looms. Moreover, the new compositions enable the use of a lower yarn loading, or pick-up of size, for a given effect; faster loom speeds can be used; the sized textiles dry and wet divide easily; and the elasticity of the sized yarns is improved.

For the sizing of synthetic fibers or of blends of cellulosic and synthetic fibers, it is advantageous to mix the low molecular dextrin phosphate with a minor proportion of a synthetic polymer such as a water soluble polyvinyl acetate, polyvinyl alcohol or polyacrylate, or with both such a synthetic polymer and a high molecular, nitrogen containing starch phosphate such as mentioned above. The amount of the synthetic polymer needs be no more than between 5 and 30% of the dry weight of the whole sizing mixture.

In this way, highly compatible compositions are obtained which form very effective sizing solutions, with reduction of the need and expense for the relatively costly synthetic polymer. Due to the high reversibility (resolubility) of films of the dextrin phosphate, these compositions also give sized textiles which can be desized more conveniently than those sized by a comparable mixture of the synthetic polymer with a conventional starch derivative such as thin-boiling starch or an oxypropylether of starch.

A composition advantageous for the sizing of fibers of acrylonitrile polymers, such as Orlon, or of blends of synthetic polyester fibers and cellulosic fibers, may be made, for example, by mixing the dextrin phosphate with a water soluble polyacrylate. Such blends can also be sized advantageously by compositions containing, by dry weight, about 50 to 70% of the dextrin phosphate with about 30 to 50% of a mixture of the polyacrylate and a high molecular nitrogen containing starch phosphate.

For sizing synthetic polyester fibers such as Terylene, or Dacron, advantageous compositions may be made to contain, for example, about 50 to 70% of the dextrin phosphate with about 30 to 50% of a mixture of the above mentioned high molecular starch phosphate and a water soluble hydrolyzed polyvinyl alcohol of medium molecular weight.

Another valuable use has been found for the new dextrin phosphates, in compositions containing them in admixture with ketene dimers for sizing the surfaces of paper, cardboard and like webs of cellulosic fibers, and particularly the surfaces of matted fibers having high contents of wood pulp or of alum, so as to improve their properties and, especially, to make them resistant to penetration by printing ink. Such compositions and the preparation, use and advantages of them are set forth more particularly and claimed in our copending application, Ser. No. 826,658, filed May 21, 1969.

The invention is further illustrated by the following examples of preferred embodiments thereof.

(A) PREPARATION OF DEXTRIN PHOSPHATES

Example 1

To 100 kg. of commercial corn starch was added by spraying a solution made up from 20 l. of water, 10 kg. of tetrasodium pyrophosphate ($Na_4P_2O_7 \cdot 10H_2O$) and 6.2 kg. of 85% orthophosphoric acid, corresponding to 3 parts of phosphorus per 100 parts of starch, of which 54% was in the orthophosphoric acid. The pH of the solution was 3. The finely divided mixture of starch and phosphorous compounds, with stirrings, was heated for 3½ hours under a vacuum of 560 mm. Hg to 85° C. The mixture was then heated to 140° C. within 1 hour under a vacuum of 70 mm. Hg, practically all the water being thus removed, and held for 1½ hours at 140° C. under the same vacuum. The resulting dextrin phosphate was then cooled to room temperature under a vacuum of 50 to 70 mm. Hg.

This product dissolved rapidly in cold water, and showed a viscosity of 5 cps. at 25° C. in 5% solution. Its solubility in water after 1 hour was 80% at 25° C. and 99% at 65° C. After washing with an 80:20 mixture of alcohol and water the product contained 1.10% of phosphorous considered to be molecularly bound.

Example 2

To 200 kg. of commercial potato starch was added a solution made up from 60 l. of water, 20 kg. of primary sodium orthophosphate ($NaH_2PO_4 \cdot 2H_2O$) and 6 kg. of 85% orthophosphoric acid, corresponding to 2.78 parts of phosphorous per 100 parts of starch, of which 29% was in the orthophosphoric acid. The pH of the solution was 3. The mixture was heated for 3 hours under a vacuum of 520 mm. Hg to 85° C. and then heated within 1 hour to 140° C. under a vacuum of 70 mm. Hg, whereby practically all the water was removed. The reaction mixture was held for 2 hours at 140° C. under a vacuum of 70 mm. Hg, after which the resulting dextrin phosphate was cooled under a vacuum of 50 mm. Hg to room temperature.

This product dissolved rapidly in cold water, showing a viscosity of 25 cps. at 25° C. in 5% solution. Its solubility in water after 1 hour was 70% at 25° C. and 92% at 65° C. After washing with alcohol it contained 0.85% of molecularly bound phosphorous.

Example 3

To 100 kg. of commercial tapioca starch was added a solution made up from 20 l. of water, 5 kg. of sodium tripolyphosphate ($Na_5P_3O_{10}$) and 2.3 kg. of 85% orthophosphoric acid, corresponding to 1.87 parts of phosphorus per 100 parts of starch, of which 33% was in the orthophosphoric acid. The pH of the solution was 4.5. The intimate mixture was heated for 3 hours to 90° C. under a vacuum of 550 mm. Hg, with stirring, then heated within 1 hour to 135° C. under a vacuum of 90 mm. Hg, whereby practically all the water was removed, and then held for 3 hours at 135° C. under a vacuum of 70 mm. Hg. The resulting dextrin phosphite was then cooled to room temperature under a vacuum of 50 to 70 mm. Hg.

This product showed a viscosity of 30 cps. at 25° C. in 5% solution. Its solubility in water after 1 hour was 60% at 25° C. and 90% at 65° C. After washing with alcohol it contained 0.80% of molecularly bound phosphorus.

Example 4

To 200 kg. of commercial wheat starch was added a solution made up from 80 l. of water, 20 kg. of primary sodium orthophosphate ($NaH_2PO_4 \cdot 2H_2O$), 30 kg. of tetrasodium pyrophosphate ($Na_4P_2O_7 \cdot 10H_2O$) and 15 kg. of 85% orthophosphoric acid, corresponding to 6.08 parts of phosphorus per 100 parts of starch, 33% of the phosphorus being added as orthophosphoric acid. The pH of the solution was 3.5. The intimate mixture was heated for 3 hours to 85° C. under a vacuum of 560 mm. Hg, with stirring. Then it was heated up within 1 hour to 140° C. under a vacuum of 70 mm. Hg, whereby practically all the water was removed, and was held for 2 hours at 140° C. under a vacuum of 70 mm. Hg. The resulting dextrin phosphate was cooled under a vacuum of 50 to 70 mm. Hg to room temperature.

A 5% solution of this product, after being heated to 95° C. and cooled, showed a viscosity of 410 cps. at 25° C. The solubility of this dextrin phosphate in water after 1 hour was 45% at 25° C. and 75% at 65° C. After washing with alcohol the product contained 2.9% of molecularly bound phosphorus.

Example 5

To 100 kg. of commercial corn starch was added a solution made up from 20 l. of water, 10 kg. of tetrasodium pyrophosphate ($Na_4P_2O_7 \cdot 10H_2O$) and 12 kg. of 85% orthophosphoric acid, corresponding to 4.63 parts of phosphorus per 100 parts of starch, of which 70% is added as orthophosphoric acid. The pH of the solution was 2. The intimate mixture was heated for 4½ hours to 90° C. under a vacuum of 540 mm. Hg, with stirring. It was then heated up within ½ hour to 125° C. under a vacuum of 70 mm. Hg, whereby practically all the water was removed. The mixture was held for 1 hour at 125° C. and finally heated up to 140° C. within ½ hour under a vacuum of 70 mm. Hg. The resulting dextrin phosphate was then cooled to room temperature under a vacuum of 50 to 70 mm. Hg.

This product dissolved rapidly in cold water, showing a viscosity of 30 cps. at 25° C. in a 28% solution. Its solubility in water at 25° C. was 100%. After washing with 80% alcohol it contained 1.5% of molecularly bound phosphorus.

Example 6

To 100 kg. of commercial potato starch was admixed 50 g. of pulverulent paraformaldehyde (0.05%). Then a solution made up from 20 l. of water, 10 kg. of tetrasodium pyrophosphate ($Na_4P_2O_7 \cdot 10H_2O$) and 2.5 kg. of 85% orthophosphoric acid was sprayed into the starch mixture. This corresponded to 2.07 parts of phosphorus per 100 parts of starch, of which 32% was in the orthophosphoric acid. The pH of the solution was 4.1. The intimate mixture was heated for 2½ hours to 90° C. under a vacuum of 580 mm. Hg, with stirring. It was then heated to 130° C. within 2½ hours under a vacuum of 80 mm. Hg and kept for one hour at 130° C. under a vacuum of 70 mm. Hg. The resulting product was cooled to room temperature under a vacuum of 50 to 70 mm. Hg.

The solubility of this product in water of 25° C. after 1 hour was 43.8%. An 8% solution of the product, after being heated to 95° C. and cooled down to 25° C., showed a viscosity of 1000 cps. This solution increased in viscosity by less than 60% upon standing for 24 hours at 25° C., and by about 75% upon standing for 48 hours at 25° C. This dextrin phosphate after washing with 80% alcohol contained 0.70% of molecularly bound phosphorus.

Example 7

To 100 kg. of commercial corn starch being stirred in a reaction vessel was added, by spraying onto the starch granules, a solution made up from 25 l. of water, 5.5 kg. of anhydrous tetrasodium pyrophosphate ($Na_4P_2O_7$), 5.9 kg. of 85% orthophosphoric acid and 0.2 kg. of a 30% solution of glyoxal. The added phosphorus compounds contained 2.86 parts of phosphorus per 100 parts of starch, of which 55% was in the orthophosphoric acid. The pH of the solution was 2.9. The intimate mixture was heated under a vacuum of 560 mm. Hg with stirring to 85° C. within 2 hours. Then it was heated up within 2½ hours to 128° C. under a vacuum of 80 mm. Hg and kept 1½ hours at 128° C. under a vacuum of 70 mm. Hg. The resulting product was cooled to room temperature under a vacuum of 50 mm. Hg.

An 8% solution of this dextrin phosphate, after being heated to 95° C. and cooled down to 25° C., showed a viscosity of 280 cps. After standing for 48 hours at 25° C. the solution showed a viscosity of 285 cps. The solubility of this dextrin phosphate in water after 1 hour was 48% at 25° C. and 89% at 65° C. After washing with an 80:20 mixture of alcohol and water the product contained 0.96% of molecularly bound phosphorus.

(B) USE OF THE DEXTRIN PHOSPHATE FOR SIZING TEXTILES

Example 8

A mixture of 60 parts of low molecular dextrin phosphate prepared according to Example 6 and 40 parts of high molecular nitrogen containing starch phosphate having a viscosity of 40,000 to 60,000 cps. in 5% solution in water (prepared according to U.S. Pat. No. 3,352,848) was dispersed in water so as to form two sizing solutions having dry substance concentrations of 15% and 11%, respectively.

These solutions were used for sizing cotton yarns of grades Ne 60/1 and Ne 20/1, respectively, in comparison with like use of conventional sizes which contained 14% and 10.5%, respectively, of acid-degraded starch. Results are shown in Table I below.

TABLE I

| Yarn | Size | Pick-up, percent | Tours abrasion test | Tensile strength, grams |
|---|---|---|---|---|
| Cotton Ne 60/1 | Ex. 8, 15% conc | 19.1 | 111/111 | 240 |
| Do | Conventional, 14% | 24.1 | 102/107 | 228 |
| Cotton Ne 20/1 | Ex. 8, 11% conc | 17.3 | 101/105 | 560 |
| Do | Conventional, 10.5% conc. | 21.1 | 94/89 | 550 |

The tests showed considerable improvements of sizing effects for the solutions making use of the present invention, along with savings of about 33% and 27%, respectively, in the amounts of size consumed.

Example 9

The mixtures denoted in Table II below, in which the dextrin phosphate was one prepared according to Example 6, were formed into sizing solutions of 8% dry substance concentration and used in comparative tests for sizing and subsequently desizing yarn made of a 67:33 blend of polyester and cellulosic fibers, with the de-sizing (size removability) results shown in the table.

TABLE II

| Sizing substance | Viscosity of 8% solution, cps. | Size removability,[1] percent |
|---|---|---|
| Low molecular dextrin phosphate plus polyacrylate, 75:25 | 1,700 | 97.5 |
| Low molecular dextrin phosphate plus high molecular starch phosphate as in Example 8 plus polyacrylate, 50:25:25 | 2,600 | 96.7 |
| Oxypropyl ether of starch plus polyacrylate, 75:25 | 1,400 | 92.5 |

[1] Weight percent of size removed by washing the sized yarn for 1 hour in water at 50° C.

Example 10

A mixture of 80 parts of low molecular dextrin phosphate prepared according to Example 2 and 20 parts of a 50% solution of a polyacrylic acid ester (water soluble polyacrylate) was made into a solution containing 10% of dry substance. This solution was used for sizing polyacrylonitrile (Orlon) fibers, and compared as to effects with silimarly used solutions of the same dry substance concentration made from substances as listed in Table III below, which table shows results of the comparative tests.

TABLE III

| Sizing substance in 10% solution | Pick-up, percent | Tours abrasion test | Elongation, percent | Tensile strength, grams | Size removability,[1] percent |
|---|---|---|---|---|---|
| Dextrin phosphate plus polyacrylate, 80:20 | 13.0 | 173/164 | 19.4 | 234 | 93 |
| Dextrin phosphate alone | 9.2 | 76/75 | 16.2 | 198 | 93 |
| Polyacrylate alone | 8.8 | 225/217 | 19.2 | 213 | 97 |
| Oxypropyl ether of starch plus polyacrylate, 80:20 | 8.6 | 85/84 | 19.2 | 214 | 69 |
| Oxypropyl ether of starch alone | 8.6 | 67/63 | 18.0 | 186 | 92 |

[1] Weight percent of size removed by washing the sized Orlon fibers for 1 hour in water at 50° C.

Example 11

A mixture of 60 parts of low molecular dextrin phosphate prepared according to Example 2, with 20 parts of the high molecular starch phosphate of Example 8 and 20 parts of an 87% hydrolyzed polyvinyl alcohol of medium molecular weight, was made into a solution containing 10% of dry substance. This solution was used for sizing synthetic polyester (Terylene) fibers, and compared as to effects with similarly used solutions of the same dry substance concentration made from substances as listed in Table IV below, which table shows results of the comparative tests.

TABLE IV

| Sizing substance in 10% solution | Pick-up, percent | Tours abrasion test | Elongation, percent | Tensile strength, grams | Size removability,[1] percent |
|---|---|---|---|---|---|
| Dextrin phosphate plus high molecular starch phosphate plus polyvinyl alcohol, 60:20:20 | 9.1 | 102/98 | 19.0 | 374 | 93 |
| Dextrin phosphate plus high molecular starch phosphate, 75:25 | 6.8 | 59/60 | 19.2 | 390 | 92 |
| Polyvinyl alcohol alone | 6.9 | 101/99 | 19.8 | 377 | 93 |
| Oxypropyl ether of starch alone | 6.7 | 63/62 | 19.4 | 394 | 66 |
| Polyvinyl alcohol plus oxypropyl ether of starch, 20:80 | 7.5 | 68/67 | 18.5 | 362 | 75 |
| Thin-boiling starch alone | 12.2 | 76/74 | 18.4 | 388 | 42 |
| Polyvinyl alcohol plus thin boiling starch, 20:80 | 8.4 | 105/108 | 19.9 | 396 | 61 |

[1] Weight percent of size removed by washing the sized Terylene fibers for 1 hour in water at 50° C.

What is claimed is:

1. A process for the preparation of a low molecular, highly water soluble dextrin phosphate, which comprises heating under low vacuum to about 80 to 90° C. a finely divided mixture of starch and an aqueous solution of alkali metal phosphate and phosphoric acid, said mixture having a pH between 2 and 5, then further heating the reaction material under increased vacuum sufficient for complete dehydration of the material, to and at a higher temperature sufficient for phosphorylation and thermal degradation of the starch until said material contains 0.3 to 3% by weight of bound phosphorus, and then cooling the material while excluding oxygen from it, thereby producing a finely divided thermally degraded phosphorylated starch product having a light color and having greater than 30% solubility in water at 25° C. and a viscosity below 500 cps. in 5% solution in water at 25° C.

2. A process according to claim 1, said solution having a pH of about 3.

3. A process according to claim 1, said mixture containing amounts of said phosphorus compounds corresponding to between 1 and 7 parts by weight of phosphorus contained therein per 100 parts of said starch, of which 25 to 70% is supplied in said phosphoric acid.

4. A process according to claim 3, said mixture being prepared by spraying onto finely divided starch a solution of said amounts of said phosphorus compounds in 10 to 40 parts of water per 100 parts of said starch.

5. A process according to claim 1, said phosphate being selected from the group consisting of alkali metal orthophosphates, metaphosphates, pyrophosphates and polyphosphates, and said acid being selected from the group consisting of ortho-, pyro- and meta-phosphoric acids.

6. A process according to claim 1, said heating under low vacuum being continued for a period of 2 to 4 hours under a vacuum of about 500 to 600 mm. Hg, said further heating being effected for 1 to 3 hours at a temperature between 125° and 140° C. under a vacuum of about 50 to 90 mm. Hg, and said cooling being effected under a vacuum of about 50 to 70 mm. Hg.

7. A process according to claim 1, said mixture also containing a small amount of a water soluble aldehyde effective, by condensing with said starch in the course of said heating, to enhance the stability of said product in aqueous solution.

8. A process according to claim 7, the amount of said aldehyde being from 0.01 to 0.2% of the weight of said starch.

9. A process according to claim 7, said aldehyde being selected from the group consisting of formaldehyde, paraformaldehyde, acetaldehyde, propionaldehyde and glyoxal.

10. A low molecular, highly water soluble dextrin phosphate consisting essentially of a finely divided thermally degraded phosphorylated starch produced by a process according to claim 1, having between 0.3 and 3% by weight of phosphorus molecularly bound therein and having a light color, a solubility higher than 30% in water at 25° C. and a viscosity in the range of about 5 to 500 cps. when in 5% solution in water at 25° C.

11. A dextrin phosphate according to claim 10, said degraded phosphorylated starch also having a small amount of an aldehyde condensed therewith and being so stable that an 8% solution thereof in water increases in viscosity by less than 70% upon standing for 24 hours at 25° C.

12. A process for the preparation of a low molecular, highly water soluble dextrin phosphate, which comprises heating for 2 to 4 hours under a vacuum of about 500 to 600 mm. Hg, to about 80 to 90° C., a mixture of finely divided starch and a solution in 10 to 40 parts of water per 100 parts of said starch of alkali metal phosphate and phosphoric acid containing per 100 parts of said starch between 1 and 7 parts by weight of phosphorus of which 25 to 70% is supplied in said phosphoric acid, said mixture having a pH between 2 and 5, then further heating the reaction material for about 1 to 3 hours under a high vacuum of about 50 to 90 mm. Hg to and at an increased temperature of about 125 to 140° C., and then cooling the material while continuing it under said high vacuum, thereby producing a finely divided thermally degraded phosphorylated starch product containing 0.3 to 3% by weight of bound phosphorus, having a light color and having greater than 30% solubility in water at 25° C. and a viscosity below 500 cps. in 5% solution in water at 25° C.

References Cited

UNITED STATES PATENTS

| | | | |
|---|---|---|---|
| 2,884,413 | 4/1959 | Kerr et al. | 260—233.5 |
| 2,879,268 | 3/1959 | Jullander | 260—232 |
| 2,884,412 | 4/1959 | Neukom | 260—233.5 |

FOREIGN PATENTS

| | | | |
|---|---|---|---|
| 812,339 | 4/1959 | Canada | 260—233.5 |

DONALD E. CZAJA, Primary Examiner

M. I. MARQUIS, Assistant Examiner

U.S. Cl. X.R.

106—212 R; 117—156 R, 139.5 C; 260—17.4 ST, 233.3 R, 233.3 A